US007013309B2

(12) United States Patent
Chakraborty et al.

(10) Patent No.: US 7,013,309 B2
(45) Date of Patent: Mar. 14, 2006

(54) METHOD AND APPARATUS FOR EXTRACTING ANCHORABLE INFORMATION UNITS FROM COMPLEX PDF DOCUMENTS

(75) Inventors: Amit Chakraborty, Cranbury, NJ (US); Liang H. Hsu, West Windsor, NJ (US)

(73) Assignee: Siemens Corporate Research, Princeton, NJ (US)

( * ) Notice: Subject to any disclaimer, the term of this patent is extended or adjusted under 35 U.S.C. 154(b) by 354 days.

(21) Appl. No.: 09/996,271

(22) Filed: Nov. 28, 2001

(65) Prior Publication Data

US 2002/0118379 A1 Aug. 29, 2002

Related U.S. Application Data

(60) Provisional application No. 60/256,293, filed on Dec. 18, 2000.

(51) Int. Cl.
*G06F 16/30* (2006.01)
*G06F 17/21* (2006.01)

(52) U.S. Cl. ............... 707/104.1; 707/102; 715/501.1

(58) Field of Classification Search ............. 707/1–10, 707/100, 101, 104.1, 500–502, 102, 201; 715/501.1, 513, 515; 705/7; 358/443, 468
See application file for complete search history.

(56) References Cited

U.S. PATENT DOCUMENTS

| | | | | |
|---|---|---|---|---|
| 5,694,594 A | | 12/1997 | Chang ......................... 707/6 |
| 5,734,837 A | | 3/1998 | Flores et al. ................. 705/77 |
| 5,752,055 A | | 5/1998 | Redpath et al. .............. 715/515 |
| 5,794,257 A | | 8/1998 | Liu et al. .................. 715/501.1 |
| 5,995,659 A | | 11/1999 | Chakraborty et al. ....... 382/176 |
| 6,078,924 A | * | 6/2000 | Ainsbury et al. ........... 707/101 |
| 6,154,754 A | | 11/2000 | Hsu et al. ..................... 715/513 |
| 6,344,906 B1 | * | 2/2002 | Gatto et al. .................. 358/443 |
| 6,374,260 B1 | * | 4/2002 | Hoffert et al. ............. 707/104.1 |
| 6,505,191 B1 | * | 1/2003 | Baclawski ....................... 707/3 |
| 6,510,406 B1 | * | 1/2003 | Marchisio ....................... 704/9 |
| 6,567,799 B1 | * | 5/2003 | Sweet et al. .................... 707/2 |
| 6,650,343 B1 | * | 11/2003 | Fujita et al. ................. 345/760 |
| 2001/0032218 A1 | * | 10/2001 | Huang ........................ 707/513 |
| 2001/0047373 A1 | * | 11/2001 | Jones et al. ................. 707/515 |
| 2002/0035451 A1 | * | 3/2002 | Rothermel ...................... 703/1 |
| 2002/0080170 A1 | * | 6/2002 | Goldberg et al. ........... 345/748 |
| 2003/0167442 A1 | * | 9/2003 | Hagerty et al. ........... 715/501.1 |
| 2004/0194035 A1 | * | 9/2004 | Chakraborty ............... 715/531 |

OTHER PUBLICATIONS

Pavlidis et al., "Page Segmentation and Classification," *CVGIP: Graphical Models and Image Processing*, 54:6 pp. 484-496, Nov. 1992.

Kasturi, et al., "A System for Interpretation of Line Drawings," IEEE Transactions on Pattern Analysis and Machine Intelligence, 12:10 pp. 978-991 Oct. 1990.

Liu, et al., "Towards Automating the Creation of Hypemedia Service Manuals by Compiling Specifications," *Proc. IEEE Multimedia*, pp. 203-212, 1994.

(Continued)

*Primary Examiner*—Jeffrey Gaffin
*Assistant Examiner*—Neveen Abel-Jalil

(57) ABSTRACT

A method for extracting Anchorable Information Units (AIUs), from a Portable Document Format (PDF) file, which may either be created using either an editor or by scanning in documents. The method includes parsing the portable document format document into textual portions and non-text portions, and extracting structure from the textual portions and the non-text portions. The method further includes determining text within textual portions, and text the non-text portions, and hyperlinking a plurality of keywords within the textual portions and non-text portions to a related document.

6 Claims, 5 Drawing Sheets

OTHER PUBLICATIONS

Krishnamoorthy, et al., "Syntactic Segmentation and Labeling of Digitized Pages from Technical Journals," IEEE Transactions on Pattern Analysis and Machine Intelligence, 15:7 pp. 737-747 Jul. 1993.

U.S. Appl. No. 09/609,206.
U.S. Appl. No. 09/607,886.
U.S. Appl. No. 10/007,373.
U.S. Appl. No. 09/996,271.

* cited by examiner

METHOD AND APPARATUS FOR EXTRACTING ANCHORABLE INFORMATION UNITS FROM COMPLEX PDF DOCUMENTS

This application claims the benefit of U.S. Provisional Application No. 60/256,293, filed Dec. 18, 2000.

BACKGROUND OF THE INVENTION

1. Field of the Invention

The present invention is concerned with processing multimedia data files to provide information supporting user navigation of multimedia data file content.

2. Background of the Invention

The demand for hypermedia applications has increased with the growing popularity of the World Wide Web. As a result, a need for an effective and automatic method of creating hypermedia has arisen. However, the creation of hypermedia can be a laborious, manually intensive job. In particular, hypermedia creation can be difficult when referencing content in documents including images and/or other media.

In many cases, the hypermedia authors need to locate Anchorable Information Units (AIUs) or hotspots that are areas or keywords of particular significance, and make appropriate hyperlinks to relevant information. In an electronic document, a user can retrieve associated information by selecting these hotspots as the system interprets the associated hyperlinks and fetches the corresponding relevant information.

Previous research in this field has taken scanned bitmap images as the input to a document analysis system. The classification of the document system is often guided by a priori knowledge of the document's class. There has been little work done in using postscript files as a starting point for document analysis. Certainly, if a postscript file is designed for maximum raster efficiency, it can be a daunting task even to reconstruct the reading order for the document. Previous researchers may have assumed that a well-structured source text will always be available to match postscript output and therefore working bottom-up from postscript would seldom be needed. However, PDF documents can be generated in a variety of ways including an Optical Character Recognition (OCR) based route directly from a bit-mapped page. The extra structure in PDF, over and above that in postscript, can be utilized towards the goal of document understanding.

Previous work proposed methods related to the understanding of raster images. Being an inverse problem by definition, this task cannot be accomplished without making broad assumptions. Directly applying these methods on PDF documents would make little sense as they are not designed to make use of the underlying structure of PDF files, and thus will produce undesirable results.

In contrast to the geometric layout analysis, logical layout analysis has received very little attention. Some methods of logical layout analysis perform region identification or classification in a derived geometric layout. However, these approaches are primarily rule based and thus, the final-outcome depends on the dependability of the prior information and how well the prior information is represented within the rules.

Systems such as Acrobat do not have the ability to process images. Rather Acrobat runs the whole document through an OCR system. Clearly, OCR is not able extract objects, but even in the case of understanding text the output can be unreliable as a general-purpose OCR can be error prone when used to understand scanned in images directly.

Therefore, a need exists for a method of analyzing and extracting text from PDF documents created using various means.

SUMMARY OF THE INVENTION

According to an embodiment of the present invention, a system is provided for processing a multimedia data file to provide information supporting user navigation of multimedia data file content. The system includes a content parser to identify text and image content of a data file, and an image processor for processing said identified image content to identify embedded text content. The system further includes a text sorter for parsing said identified text and said identified embedded text to locate text items in accordance with predetermined sorting rules, and memory for storing a navigation file containing said text items.

The navigation file links to at least one internal document object. The navigation file links to at least one external document object.

The image processor includes a black and white image processor including a pixel smearing component reducing text to a rectangular block of pixels, and an image filtering component for cleaning a smeared image.

The content parser applies text extraction rules to identify text and identify a document structure, wherein the document structure defines a context for identified text. The content parser applies pre-defined hierarchical rules for determining a level of identified text.

The image processor applies object templates to identify embedded text.

The system refines a search resolution during a text identifying process to determine a location of the embedded text within an image.

Identified text comprises hyperlinks.

According to another embodiment of the present invention, a graphical User interface system is provided supporting processing of a multimedia data file to provide information supporting user navigation of multimedia data file content. The graphical User interface system includes a menu generator for generating, one or more menus permitting User selection of, an input file and format to be processed, and an icon permitting User initiation of generation of a navigation file supporting linking of input file elements to external documents by parsing and sorting text and image content to identify text for incorporation in a navigation file.

Identified text comprises hyperlinks.

The navigation file further comprises links to at least one internal document object.

According to an embodiment of the present invention, a method is provided for creating an anchorable information unit in a portable document format document. The method includes extracting a text segment from the portable document format document, determining a context of the segment, wherein the context is selected from a context sensitive hierarchical structure, and defining the text segment as an anchorable information unit according to the context.

The portable document format document includes one or more textual objects and one or more non-textual objects, wherein the objects include textual segments.

Determining the context includes comparing the text segment to a plurality of known patterns within the portable document format document, and determining the context upon determining a match between the text segment and a known pattern of the portable document format document.

Extracting text further includes extracting text form an image of the portable document format document, determining an image type, wherein the type is one of a black and white image, a grayscale image, and a color image, and processing the image according to the type.

The portable document format document includes a known context sensitive hierarchical structure. The context sensitive hierarchical structure, including the anchorable information unit, is searchable. The context includes a location of the extracted text segments. Determining the context includes determining a location and a style of the text segment.

The method further includes storing the text segment in a Standard Generalized Markup Language syntax using a predefined grammar.

The achorable information unit is automatically hyperlinked.

According to an embodiment of the present invention, a method is provided for creating an anchorable information unit file from a portable document format document. The method includes parsing the portable document format document into textual portions and non-text portions. The method further includes extracting structure from the textual portions and the non-text portions, and determining text within textual portions, and text the non-text portions. The method hyperlinks a plurality of keywords within the textual portions and non-text portions to at least one related document.

Parsing further comprises the step of differentiating color image content, black-and-white content, and grayscale content.

Extracting further comprises determining a level for extracted textual portions, associating the context with the text, and pattern matching extracted text to the portable document format document to determine a context. The level is one of a paragraph, a heading and a subheading. Pattern matching includes determining a median font size for the portable document format document, comparing a font size of the extracted text to the median font size for the portable document format document, and determining a context according to font size.

Hyperlinking includes creating the anchorable information unit file, wherein the plurality of keywords are anchorable information units.

According to an embodiment of the present invention, a program storage device is provided, readable by machine, tangibly embodying a program of instructions executable by the machine to perform method steps for creating an anchorable information unit file from a portable document format document.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
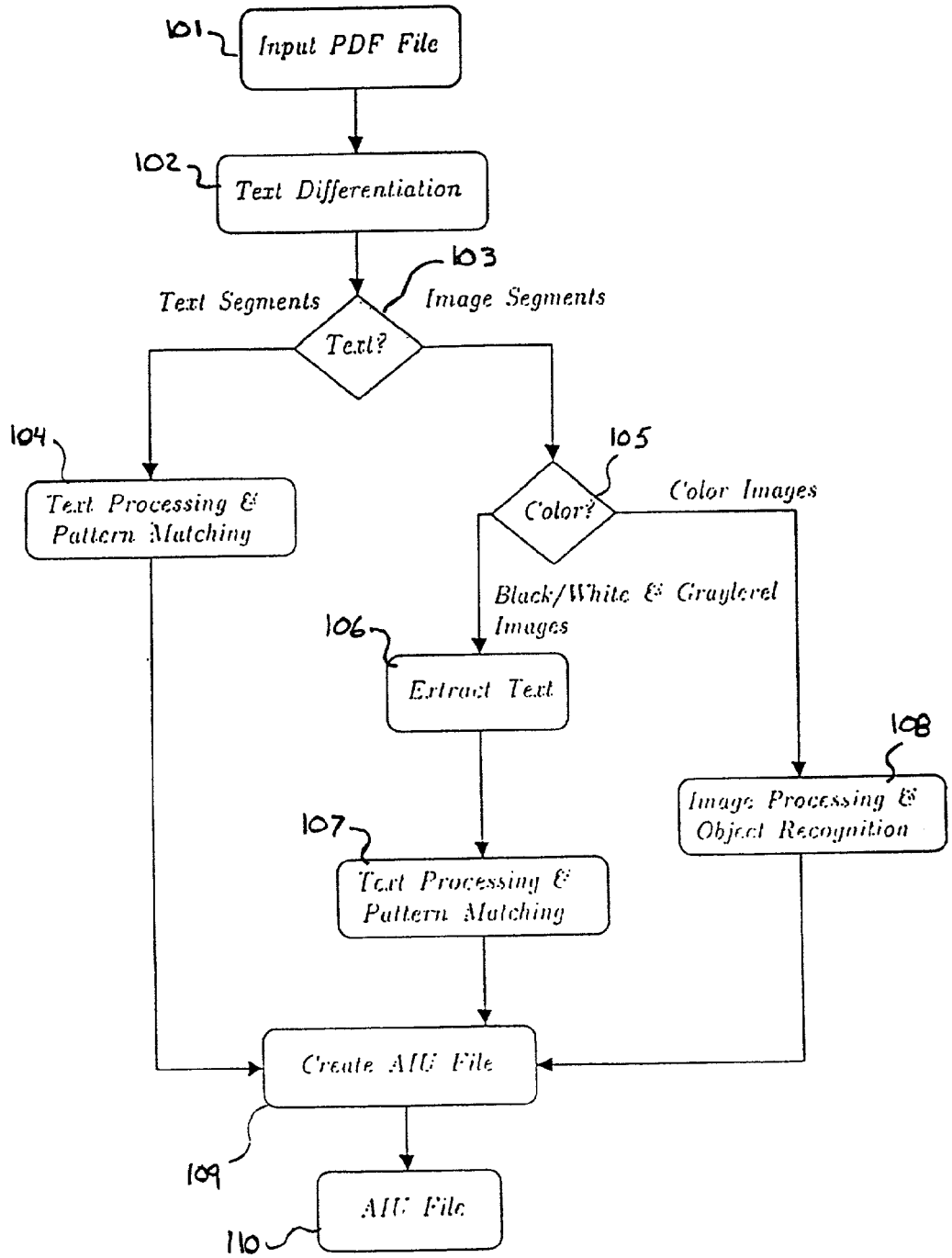
FIG. 1 is a flow chart showing an overview of a method of creating an anchorable information unit according to an embodiment of the present inventin.

The present invention provides an automated method for locating hotspots in a PDF file, and for creating cross-referenced AIUs in hypermedia documents. For example, text strings can point to a relevant machine part in a document describing an industrial instrument.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The PDF files under consideration can include simple text, or more generally, can include a mixture of text and a variety of different types of images such as black and white, grayscale and color. According to an embodiment of the present invention, the method locates the text and non-text areas, and applies different processing methods to each. For the non-text regions, different image processing methods are used according to the type of images contained therein.

The extraction of AIUs is important for the generation of hypermedia documents. However, for some PDF files, e.g., those that have been scanned into a computer, this can be difficult. According to an embodiment of the present invention, the method decomposes the document to determine a page layout for the underlying pages. Thus, different methods can be applied to the different portions of a page. A geometric page layout of a document is a specification of the geometry of the maximal homogeneous regions and their classification (text, table, image, drawing etc). Logical page layout analysis includes determining a page type, assigning functional labels such as title, note, footnote, caption etc., to each block of the page, determining the relationships of these blocks and ordering the text blocks according to a reading order.

OCR has had an important role in prior art systems for determining document content. Accordingly, OCR has received most of the research focus. Page segmentation plays an important role in this domain because the performance of a document understanding system as a whole depends on the preprocessing that goes in before the OCR.

The present invention analyzes the document and extracts information from the text and/or figures that can be located anywhere within the document. The method determines the context in which these hotspots (e.g., objects or text-segments of interest) appear. Further, the method saves this information in a structured manner that follows a predefined syntax and grammar that allows the method to refer to that information while creating automatic hyperlinks between different documents and media types.

A flow chart showing the main stages in the graphics recognition process is shown in FIG. 1. The input to the system includes a PDF file 101. The method parses the file into areas of text and non-text 102. The text and non-text regions are analyzed to extract structure and other relevant information 103. The method determines text within regular text blocks 104, as well as text within the images 105–108 (if any), such as item numbers within an engineering drawing. The method distinguishes between color images and black and white images 105 before extracting text from an image. These text segments are used for hyperlinking with other documents 109–110, for example, another PDF file or any other media type such as audio, video etc.

In order to help application programmers extract words from PDF files, Adobe Systems provides a software development kit (SDK) that gives access, via the application programmers interface (API) of Acrobat® viewers, to the underlying portable document model, which the viewer holds in memory. The SDK is able to conduct a search for PDF documents. For PDF documents that are created directly from a text editor such as Microsoft's Word or Adobe's FrameMaker®, this works quite well, however for scanned in documents, the performance can decrease significantly. Additionally, for double columned documents, the SDK can be error prone. SDK was designed primarily for documents created using a text editor. Therefore, performance with documents created by other means, was not an important issue. The present invention uses an alternative strategy for scanned in documents.

According to an embodiment of the present invention, the method extracts words along with their location in the document, and the style used to render them. The method not only determines whether a certain word exists in a page or not, but also determines the location and the context in which it appears, so that a link can be automatically created from the location to the same media or a different one based on the content.

Figure 2:
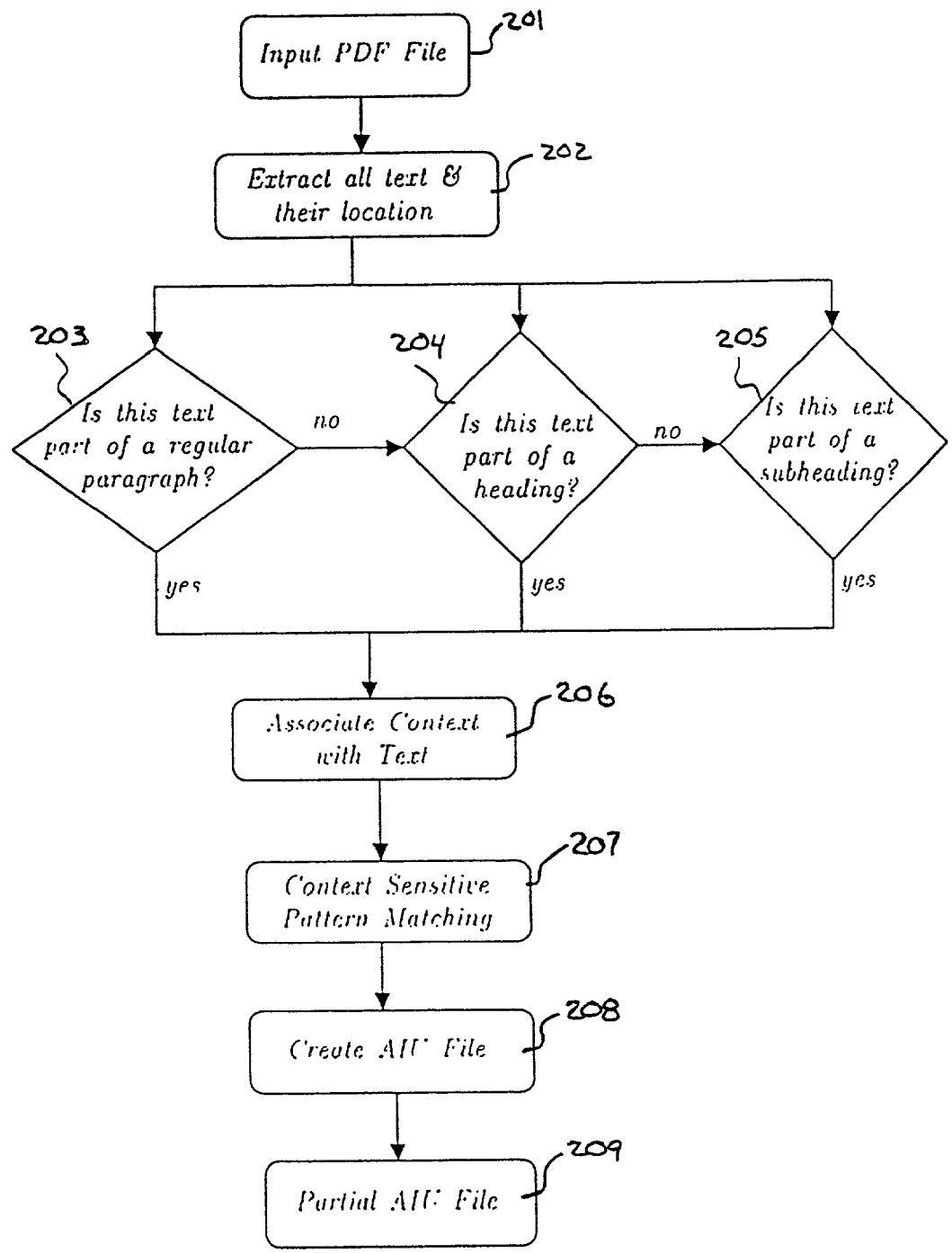
FIG. 2 is a flow chart showing a method of creating an anchorable information unit according to an embodiment of the present invention.

Referring to FIG. 2, the method extracts 202 text, the coordinates of the text, and the text style from a PDF file 201. The method analyzes parameters of the PDF file to determine the context in which the text appears 203–205. The parameters include, inter alia, paragraphs 203, headings 204, and subheadings 205. The method further extracts text and associated bounding boxes, and page numbers. The parameters of a bounding box are determined from the extracted coordinates. The method associates context with text 206. For example, if the bounding box is aligned horizontally with several other words, e.g., if the text appears at similar heights and is part of a larger group, then the method determines this text to be part of regular text (e.g., a paragraph) for the page, as opposed to, for example, a heading.

The method determines the median font size for a portion of the text document and performs context sensitive pattern matching 207. If the font size for a portion of text is larger than the median, and if the text portion is small, e.g., the text does not extend more than a single line, the method determines this to be part of a heading. Upon determining a heading, the method checks the text level, e.g., whether it belongs to a chapter heading, a section heading, a subsection, etc. The text level can also be determined from the relative font sizes used and offsets from the right or left margin, if any.

Once the method has determined all the text information regarding the organization of the document, the method uses organization information to selectively create Anchorable Information Units (AIUs) 208–209 or hotspots. The method automatically or semi-automatically creates these hotspots in a context sensitive non-redundant manner based on the organization information.

The present invention provides a method for extracting images. What makes this problem challenging is that text may not be distinguished from polylines, which constitute the underlying line drawings. While developing a general method that would work for all kinds of line-drawing images is difficult, the present invention makes use of underlying structures of the concerned documents. The present invention localizes images according to the geometry and length of the text strings. These localized regions are analyzed using OCR software to extract the textual content.

Figure 3A:
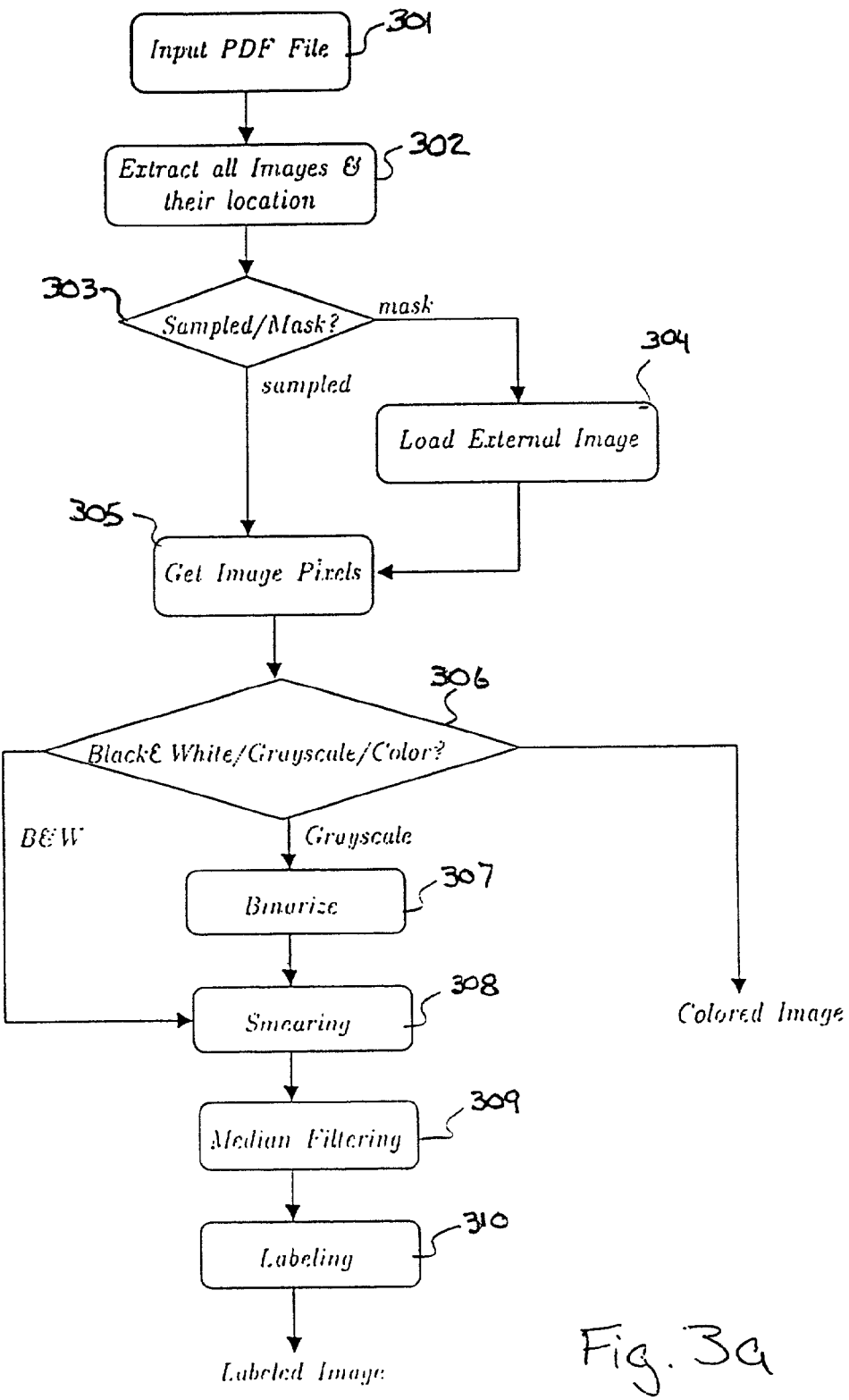
FIGS. 3a–b are a flow chart showing a method of creating an anchorable information unit according to an embodiment of the present invention.
Figure 3B:
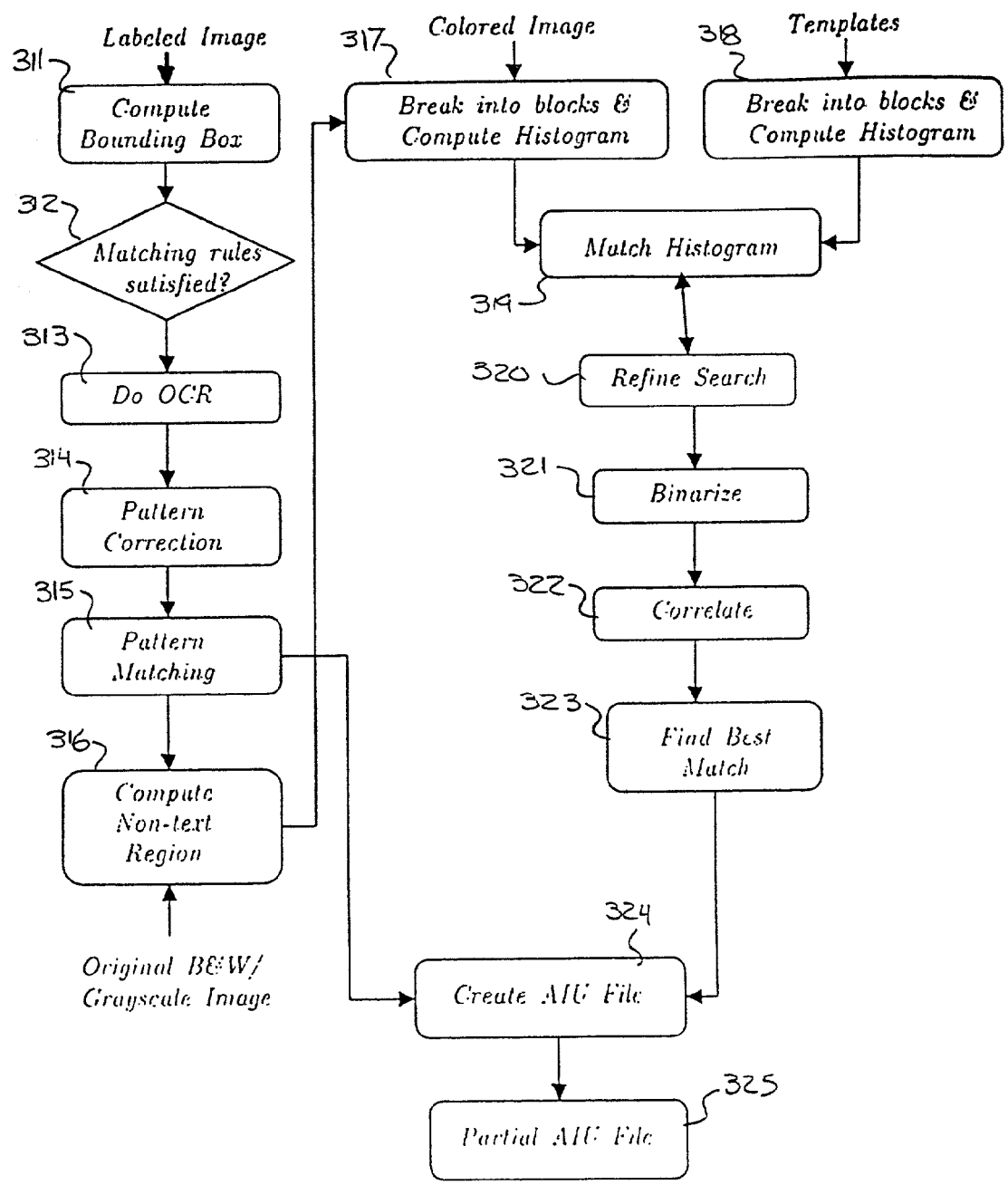

Referring to FIGS. 3a and 3b, the method extracts images and their location 302 from a PDF file 301. In PDF files, various types of images can be encoded, including black and white, grayscale and colored images. Objects of interest can be encoded in any of these images. For example, a black and white image can be used to encode a computer aided design (CAD) drawing. CAD images can include, for example, diagrams of predefined objects or text segments that may refer to important information, such as machine parts. Other images can include, for example, descriptions of machine parts, especially if the documents are of an engineering nature.

In PDF, an image is called an Xobject, whose subtype is Image. Images allow a content stream to specify a sampled image or image mask. The method determines the type of image 303. PDF allows for image masks, e.g., 1-bit, 2-bit, 4-bit and 8-bit grayscale images and color images with 1, 2, 4 or 8 bits per component. An image mask, such as an external image, can be embedded within the PDF file. For embedded images, the method determines a reference to that image, and based on the type of image and the file format, an appropriate decoding technique can be used to extract the image and process it 304. However, if it is a sampled image, then the image pixel values are stored directly within the PDF file in a certain encoded fashion. The image pixel values can be first decoded and then processed 305.

The method simplifies the images to extract text strings 306. The grayscale images are converted to black and white images by thresholding 307. The method looks for text strings in either grayscale or black/white images. Thus, if the image is non-colored, it is reduced to black and white.

For the black and white images, the method smears the image 308. Within an arbitrary string of black and white pixels the method replaces white pixels with black pixels if the number of adjacent white pixels between two black pixels is less than a predetermined constant. This constant is related to the font-size and can be user-defined. This operation is primarily engaged in the horizontal direction. The operation closes the gaps that may exist between different letters in a word and reduce a word to a rectangular block of black pixels. However, it also affects the line drawings in a similar fashion. The difference here is that by the very nature of their appearance, text words after the operation look rectangular of a certain height (for horizontal text) and width (assuming that the part numbers that appear in an engineering drawing are likely to be of a certain length). However, the line drawings generate irregular patterns, making them discernible from the associated text.

The method cleans the resultant image by using median filtering 309 to remove small islands or groups of black pixels. The method groups the horizontal runs of black pixels into groups separated by white space and associate labels to them 310. The method computes a bounding box 311 for each group and computes such features as width, height, aspect ratio and the pixel density, e.g., the ratio of the number of black pixels to the area of the bounding box.

The method implements rules 312 to determine whether there is text inside the bounding box and if so, whether the text is of interest. The method rules out regions that are either too big or too small using a threshold technique. The method searches for a word or two that makes up an identifier, such as a part number or part name. The method also rules out regions that are square in nature rather than rectangular as defined by the aspect ratio width/height as normally words are several characters long and have a height of one character. The method also rules out regions that are relatively empty e.g., the black pixels are connected in a rather irregular, non-rectangular way. This is a characteristic of line drawings and is unlikely to be associated with text strings. The limits in the above are domain dependent and the user has the ability to choose and modify them based on the characteristics of the document processed.

After the plausible text areas have been identified, the method uses an OCR toolkit 313 to identify the ASCII text that characterizes the plausible regions identified above. Once the method has determined the text, a pattern matching method is used 314 to correct for errors that may have been made by the OCR during recognition. For example, the OCR may have erroneously substituted the letter "o" for the numeral "0". If the method is aware of the context, such errors can be rectified.

The method keeps words and/or phrases of interest and saves them in an AIU file. Once the method has extracted and saved the text of interest, object parts, if any, are identified within the images 316.

To increase the speed of the method, the non-text regions of the image are parsed into blocks. A histogram of the pixel gray level or color values in these blocks 317–318 is then analyzed. For a color image, the method analyzes a histogram for the whole image.

The method implements templates of objects that are being searched for in the image. The method parses the template into blocks and determines a histogram for the blocks. The method determines locations in the original image of blocks that have a similar histogram signature as that of the template. Upon determining a match 319, the method performs a more thorough pixel correlation 320 to determine the exact location.

The method can begin with at a low resolution, for example, using 32×32 blocks. If a match is found, the method can reiterate at a higher resolution, e.g., 16×16. After the reiteration to a scale of, for example, 8×8, the method correlates the template with the original to find a location of a desirable match. However, before performing a correlation, the method binarizes the image 321, if it is not already in binary form, by computing edges. For the binarized image, the method performs a correlation for the edges. Thus, the method can reduce the amount of processing needed to process an image.

Matches are determined using a threshold 323, which can be set at $0.6 \times N_e$ where $N_e$ is the number of edge points in the template. The method determines the information needed both for the text and non-text portion of the PDF files and the assimilated information is stored in AIU files 324–325 using a Standard Generalized Markup Language (SGML). SGML syntax can be used to create hyperlinks to other parts of the same document, or to other documents or non-similar media types.

According to an embodiment of the present invention, the structure of PDF documents is defined in SGML. The structural information can be used to capture the information extracted from a PDF. The objects that are extracted from the PDF are termed Anchorable Information Units (AIUs). Since information extracted from a PDF document is represented as an instance of the PDF AIU Document Type Definition (DTD), and thus, well structured, the method can perform automatic hyperlinking between the PDF documents and other types of documents. Therefore, when the user clicks on the object during browsing, the appropriate link can be navigated to reach the desired destination.

After processing, each PDF file is associated with an AIU file, which includes relevant information extracted from the PDF file. The AIU file is defined in a hierarchical manner as follows:

At the root the AIUDoc definition encompasses the header, footer and the extracted information within the PdfDocX field.

```
<!ELEMENT    AIUDoc     --(DocHeader,    PdfDocX,
DocFooter)>
<!ATTLIST    AIUDoc
             Id         CDATA           #IMPLIED
             Type       CDATA           #IMPLIED
             Name       CDATA           #IMPLTED
>
```

The definition of the DocHeader is given as:

```
<!ELEMENT    DocHeader    --(DocType, DocDesc)>
<!ATTLIST    DocHeader
             Id           CDATA      #IMPLIED
             Type         CDATA      #IMPLIED
             Name         CDATA      #IMPLIED
             File         CDATA      #IMPLIED
>
``` and the fields in the PdfDocX is given by (these fields will be defined below):

```
<!ELEMENT    PdfDocX    --((PdfObject | PdfAIU)*)>
<!ATTLIST    PdfDocX
             Id         CDATA      #IMPLIED
>
```

The PdfSeg field, which characterizes the sections is defined as:

```
<!ELEMENT    PdfSeg    --((PdfSeg | PdfAIU)*)>
<!ATTLTST    PdfSeg
             ID        CDATA       #IMPLIED
>
``` while the PdfSeg2 fields which are the segments in this document are defined by:

```
<!ELEMENT    PdfSeg2       --(PdfAIU*)>
<!ATTLIST    PdfSeg2
             Id            CDATA       #IMPLIED
             StartLocation CDATA       #IMPLIED
             EndLocation   CDATA       #IMPLIED
>
``` the AIUs are defined using the following fields:

```
<!ELEMENT    PdfAIU        --(Link*)>
<!ATTLIST    PdfAIU
             Id            CDATA       #IMPLIED
             Type          CDATA       #IMPLIED
             Name          CDATA       #IMPLIED
             BoundaryCoords CDATA      #IMPLIED
>
```

Thus, an AIU file is a sequence of one or more parsable character data. In the example, the character data includes a string of ASCII characters and numbers. While various attributes relevant to PDF AIUs are listed above, additional attributes can be relevant for AIUs related to other media types. As mentioned before, the method structures the PDF document in a hierarchical manner. At the root is the entire document. The document is broken up into sub-documents. The AIU file starts with a description of the type of the underlying media type, which in this case is PDF. The document header includes four different fields including the underlying PDF file name, an unique identifier for the whole PDF file, a document type definition, which explains the context of the PDF file, and a more specific document description explaining the content of the PDF file.

The information extracted from the PDF file is stored within the PDFDocX structure. The PDFDocX structure includes a unique identifier derived from the identifier of the PDF file itself. The PDF document is organized in a hierarchical manner using sub-documents and segments. The segments have the following attributes. Once again, there is a unique identifier for each segment. The start and end locations of these segments define the extent of these sections. Based on the needs and size of the document, further attributes can be used as well.

The PDF AIUs include a unique identifier. The PDF AIUs can be of the following types: rectangle, ellipse and polygon. Each AIU also has a unique name. The BoundaryCoords field describes the coordinates of the underlying object of interest and defines the bounding box. The page field describes the page location of the underlying document. In case of rectangles and ellipses, the upper left and lower right corners of the bounding box are defined. In case of a polygon, all the nodes are defined.

An example of a PDFAIU file is given below. The link definition is described in the following subsection.

```
<AIUDoc>
<DocHeader Type ="Pdf" File="test.aiu" ID="Ntest">
<DocType>Training,/DocType>
<DocDesc>Overview of test engine</DocDesc>
</DocHeader>
<PdfDocX Id="IDV942">
<PdfSeg Id="section1">
<PdfSeg2 Id="IDV942P1" StartLocation="0" EndLocation="20">
</PdfSeg2>
<PdfSeg2 Id="IDV942P2" StartLocation="21" EndLocation="50">
</PdfSeg2>
</PdfSeg>
<PdfAIU   Id="PAIU01"   Type="rectangle"   Name="object1"
Page="2" BoundaryCoords="66 100 156 240">
</PdfAIU>
<PdfAIU Id="PAIU02" Type="ellipse" Name="object2" Page="8"
BoundaryCoords="100 156 240 261">
</PdfAIU>
<PdfAIU Id="PAIU03" Type="polygon" Name="object1" Page="22"
BoundaryCoords="438 81 411 88 397 102 383 138 406 185 480
175 493 122 465 89 438 81">
</PdfAIU>
</PdfDocX>
<DocFooter></DocFooter>
</AIUDoc>
```

Hyperlinking for the PDF AIUs can be done manually or in an automatic fashion. Manual links can be inserted during the AIU outlining phase described before. However, according to an embodiment of the present invention, since the information extracted from PDF is stored in well-structured AIU files, the method includes an Automatic Hyperlinker to automatically hyperlink PDF AIUs with all other types of documents based on Hyperlink Specifications. That is, the Hyperlinker processes link specifications, performs pattern matching on the contents and structures of the documents, and establishes links between sources and destinations. Also important is how the link information encoded within the AIU files. Each of the objects encoded can potentially have a link. Since the SGML structure has been adopted for the AIU files and links are entities within that file, Links are also defined using a similar SGML structure. The definition and the fields are given below:

```
<!ELEMENT    Link         --((#PCDATA)+) >
<!ATTLIST    Link
             LinkID       CDATA       #IMPLIED
             Type         CDATA       #IMPLIED
             SubType      CDATA       #IMPLIED
             Linkend      CDATA       #IMPLIED
             Book         CDATA       #IMPLIED
             Focus        CDATA       #IMPLIED
             LinkRuleId   CDATA       #IMPLIED
             .........
>
```

The Type defines the type of the destination, e.g., if it is text or image or video, etc. Focus defines the text that is highlighted at the link destination. Book represents the book that the destination is part of. In the example, since the main application is a hyperlinked manual, they are organized as a hierarchical tree, where each manual is represented as a book. Linkend, the most important attribute, contains the destination information. LinkId is an index to the database if the destination points to that. LinkruleId indicated what rule created this link. SubType is similar to the Type definition in the AIU specification above. Labels give a description of the link destination. There can be other attributes as well.

In the following, an instance of a hyperlinked AIU file is provided. That is, Link elements can be manually, or automatically added to PDF AIUs that are to be hyperlinked to their destinations during playback.

```
<AIUDoc>
<DocHeader Type="Pdf" File="test.aiu" ID="Ntest">
<DocType>Training,/DocType>
<DocDesc>Overview of test engine</DocDesc>
</DocHeader>
<PdfDocX Id="IDV942">
<PdfSeg Id="section1">
<PdfSeg2 Id="IDV942P1" StartLocation="0" EndLocation="20">
</PdfSeg2>
<PdfSeg2 Id="IDV942P2" StartLocation="21" EndLocation="50">
</PdfSeg2>
</PdfSeg>
<PdfAIU    Id="PAIU01"    Type="rectangle"    Name="object1"
Page="2" BoundaryCoords="66 100 156 240">
<Link    Type="Text"    SubType="ID"    LinkId="7001"
Linkend=" "N13509426" Book="31" Labels="Text Document in Vol
3.1">
</Link>
</PdfAIU>
<PdfAIU Id="PAIU02" Type="ellipse" Name="object2" Page="8"
BoundaryCoords="100 156 240 261">
BoundaryCoords="66 100 156 240">
<Link    Type="Image"    SubType="ID"    LinkId="7001"
Linkend=" "N13509426" Book="31" Labels="Image Description">
</Link>
</PdfAIU>
<PdfAIU Id="PAIU03" Type="polygon" Name="object1" Page="22"
BoundaryCoords="438 81 411 88 397 102 383 138 406 185 480
175 493 122 465 89 438 81">
</PdfAIU>
</PdfDocX>
<DocFooter></DocFooter>
</AIUDoc>
```

The SGML documents (including the AIU files) are preindexed using the SGML Indexer. This includes a dictionary listing every SGML element in the order they appear in the documentation and an index into that dictionary. Based on the user-defined link specifications, links are created using pattern matching on these dictionary files. For PDF AIUs, links can be created to and from them in this way. The main point to note about the hyperlinker is that the method is able to use this machinery within the PDFAIU authoring system by being able to structure the PDF information using the AIU specification language as explained before. This also allows the method to implement a hyperlink management system that can incrementally update link rules. The link manager software that uses the link database to keep track of link rule changes by using time stamps does this. Incremental hyperlinking is done either by changing existing link specifications or by adding some extra link specifications. When adding new link specifications, the hyperlinker executes the new link specification on all documents, adds new links without destroying the old ones. When a link becomes obsolete, based on the Id of the old link, the old links are removed. A similar procedure is adopted when adding new links.

After the hyperlinking has been achieved, it is important to be able to get the desired functionality while viewing. The current implementation modifies Adobe Acrobat® Reader™ and uses a special purpose software to achieve interprocess communication via a link manager. When the viewer is given a command to load a certain PDF file, while loading it, it also looks to see if an AIU file is available for that file. If so, it is also loaded along with the original file. For each entry, in the AIU file, a boundary is drawn around the object of interest. If the user clicks on any of the objects, the viewer communicates with the link manager with the appropriate Link Identifier. The Link Manager then executes the link destination. Often within a multimedia documentation environment, this means jumping to a particular point of the text or showing a detailed image of the object in question. In that case the SGML browser jumps to that point in the SGML document.

Figure 4:
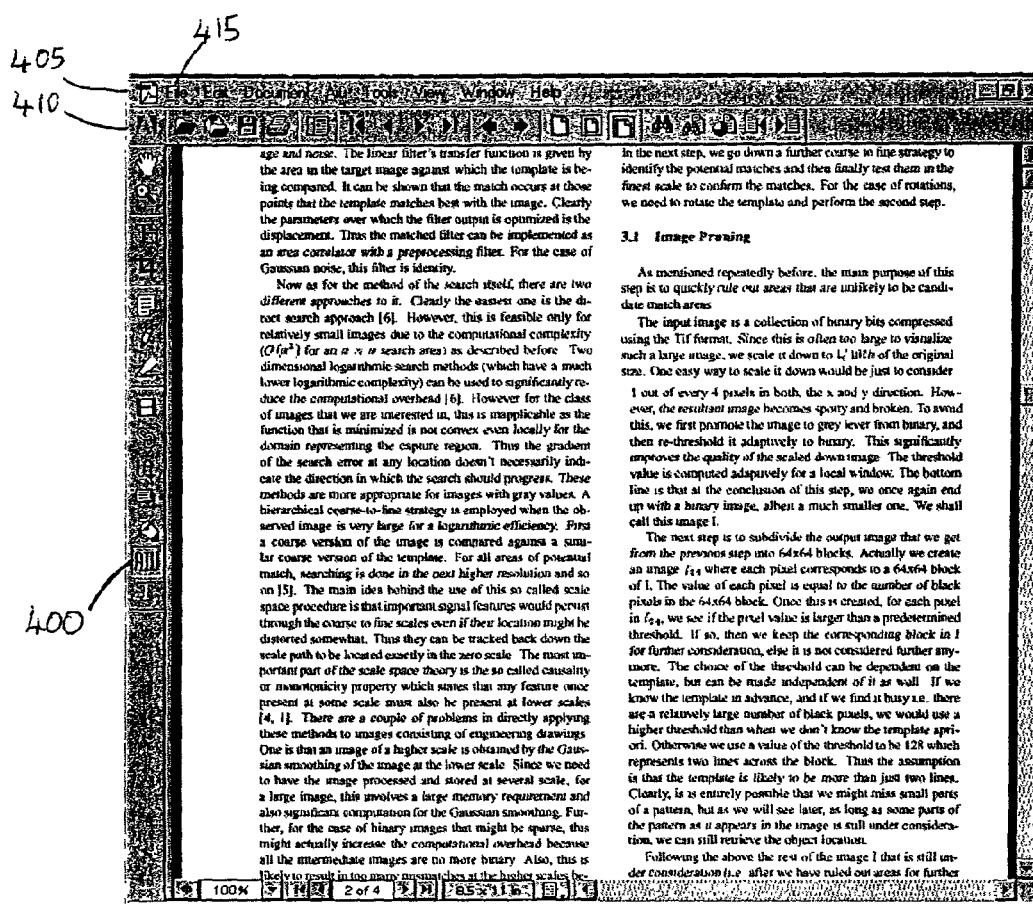
FIG. 4 shows a graphical User interface display supporting processing of a multimedia data file to provide information for use in navigating multimedia data file content, according to an embodiment of the present invention.

FIG. 4 shows a graphical User interface display supporting processing of a multimedia data file to provide information for use in navigating multimedia data file content. User selection of icon 400 permits User initiation of generation of a navigation file supporting linking of input file elements to external documents by parsing and sorting text and image content to identify text for incorporation in a navigation file. Further, in response to user selection of icon 400, items are activated within menus generated upon user selection of a member of toolbars 405 and 410. Specifically, a menu permitting User selection of an input file and format to be processed is generated in response to user selection of icon 415.

Having described embodiments for a method of extracting anchorable information units from PDF files, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A system for processing an unstructured multimedia data file to provide information supporting user navigation of multimedia data file content, comprising:
   a page layout analyzer to establish page layouts for each page of the unstructured multimedia data file, the analyzer creating a structure of for each page layout including text sections and image sections of each page;
   a content parser to identify previously unidentified text and image content of a data file, the content parser applying text extraction rules to identify text and identify a document structure, wherein context is defined for the identified text based on its associated document structure;
   a black and white image processor for processing said identified image content to identify embedded text content by applying object templates, the image processor comprising a pixel smearing component reducing text to a rectangular block of pixels and an image filtering component for cleaning a smeared image;
   a text sorter for parsing said identified text and said identified embedded text to locate text items in accordance with predetermined sorting rules;
   a document processor for hyperlinking a plurality of keywords within the identified text and identified embedded text to a related document by creating an anchorable information unit file, wherein the plurality of hyperlinked keywords are anchorable information units; and
   memory for storing a navigation file containing said text items and said anchorable information unit file.

2. The system of claim 1, wherein the navigation file links to at least one internal document object.

3. The system of claim 1, wherein the navigation file links to at least one external document object.

4. The system of claim 1, wherein the content parser applies pre-defined hierarchical rules for determining a level of identified text.

5. The system of claim 1, wherein the system refines a search resolution during a text identifying process to determine a location of the embedded text within an image.

6. The system of claim 1, wherein identified text comprises hyperlinks.

* * * * *